(12) United States Patent
Wu et al.

(10) Patent No.: US 11,314,829 B2
(45) Date of Patent: Apr. 26, 2022

(54) ACTION RECOMMENDATION ENGINE

(71) Applicant: Intuit Inc., Mountain View, CA (US)

(72) Inventors: Grace Wu, Redwood City, CA (US); Xiangling Meng, Mountain View, CA (US); Ying Yang, Sunnyvale, CA (US); Abhishek Jain, Mountain View, CA (US); Jinlong Liu, Newark, CA (US)

(73) Assignee: Intuit Inc., Mountain View, CA (US)

( * ) Notice: Subject to any disclaimer, the term of this patent is extended or adjusted under 35 U.S.C. 154(b) by 211 days.

(21) Appl. No.: 16/888,637

(22) Filed: May 29, 2020

(65) Prior Publication Data

US 2021/0374201 A1    Dec. 2, 2021

(51) Int. Cl.
| | |
|---|---|
| *G06F 16/00* | (2019.01) |
| *G06F 16/9535* | (2019.01) |
| *G06F 17/16* | (2006.01) |
| *G06K 9/62* | (2022.01) |

(52) U.S. Cl.
CPC .......... *G06F 16/9535* (2019.01); *G06F 17/16* (2013.01); *G06K 9/6267* (2013.01)

(58) Field of Classification Search
CPC .................................................. G06F 16/9535
USPC .......................................................... 707/706
See application file for complete search history.

(56) References Cited

U.S. PATENT DOCUMENTS

| | | | | |
|---|---|---|---|---|
| 8,311,863 B1 * | 11/2012 | Kemp | ................ | G06Q 10/0639 705/7.29 |
| 8,935,279 B2 * | 1/2015 | Skeen | ................... | G06F 16/686 707/754 |
| 9,648,130 B1 * | 5/2017 | Tam | ....................... | G06Q 50/01 707/707 |
| 10,503,804 B1 * | 12/2019 | Walters | ..................... | G06F 8/77 707/707 |
| 10,922,718 B2 * | 2/2021 | Hong | ................. | G06Q 30/0269 707/707 |
| 10,963,808 B1 * | 3/2021 | Kumari | .................. | G06N 20/00 707/707 |
| 11,210,301 B2 * | 12/2021 | de Almeida Forjaz de Lacerda .. | | G06F 16/95 707/707 |
| 2011/0295722 A1 * | 12/2011 | Reisman | ............ | G06Q 30/0641 705/26.1 |
| 2012/0072976 A1 * | 3/2012 | Patil | .................... | H04W 12/069 726/5 |
| 2015/0326522 A1 * | 11/2015 | Pu | ........................... | H04L 51/12 709/206 |
| 2018/0210964 A1 * | 7/2018 | Esmailzadeh | .......... | G06F 16/25 707/707 |

(Continued)

*Primary Examiner* — Alexandria Y Bromell
(74) *Attorney, Agent, or Firm* — Ferguson Braswell Fraser Kubasta PC (57) ABSTRACT

A method may include receiving, from a software application, pre-signup data of a user, embedding the pre-signup data to obtain a pre-signup data vector, generating, by applying a topic model to the pre-signup data vector, a pre-signup topic vector, receiving action descriptions of actions of the software application, embedding the action descriptions to obtain action description vectors, generating, by applying the topic model to the action description vectors, action description topic vectors, generating scores by multiplying the pre-signup topic vector and the action description topic vectors, and recommending, to the user and using the scores, an action.

20 Claims, 9 Drawing Sheets

(56) References Cited

U.S. PATENT DOCUMENTS

2019/0188326 A1*  6/2019  Daianu ................... G06N 3/08
                                                707/707
2019/0243923 A1*  8/2019  Kveton ............... G06F 16/9535
                                                707/707

* cited by examiner

Recommended
Action
470

ACTION RECOMMENDATION ENGINE

BACKGROUND

New users of a software application may be confused regarding how to start using the software application due to the large number of features and options provided. Some software applications help onboard a new user based on the user's optional selection(s) from a list of possible actions. Based on the user's selection(s), the software application may propose an initial action or actions for the user to perform. However, users often fail to select an action, or select all of the possible actions, making it challenging for the software application to offer meaningful onboarding guidance to the new user.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, from a software application, pre-signup data of a user, embedding the pre-signup data to obtain a pre-signup data vector, generating, by applying a topic model to the pre-signup data vector, a pre-signup topic vector, receiving action descriptions of actions of the software application, embedding the action descriptions to obtain action description vectors, generating, by applying the topic model to the action description vectors, action description topic vectors, generating scores by multiplying the pre-signup topic vector and the action description topic vectors, and recommending, to the user and using the scores, an action.

In general, in one aspect, one or more embodiments relate to a system including a computer processor and a repository configured to store pre-signup data of a user, action descriptions of actions of a software application, a pre-signup data vector, a pre-signup topic vector, action description vectors, action description topic vectors, and scores. The system further includes a recommendation engine executing on the computer processor and configured to receive, from the software application, pre-signup data of a user, embed the pre-signup data to obtain the pre-signup data vector, generate, by applying a topic model to the pre-signup data vector, the pre-signup topic vector, receive the action descriptions, embed the action descriptions to obtain the action description vectors, generate, by applying the topic model to the action description vectors, the action description topic vectors, generate the scores by multiplying the pre-signup topic vector and the action description topic vectors, and recommend, to the user and using the scores, an action.

In general, in one aspect, one or more embodiments relate to a method including receiving, via a graphical user interface (GUI), pre-signup data of a user, receiving action descriptions of actions of a software application, and sending the pre-signup data and the action descriptions to a recommendation engine. The recommendation engine embeds the pre-signup data to obtain a pre-signup data vector, generates, by applying a topic model to the pre-signup data vector, a pre-signup topic vector, embeds the action descriptions to obtain action description vectors, generates, by applying the topic model to the action description vectors, action description topic vectors, generates scores by multiplying the pre-signup topic vector and the action description topic vectors, and recommends, to the user and using the scores, an action. The method further includes receiving, via the GUI, a recommendation of the action, and displaying, in an element within the GUI generated by a computer processor, a workflow for the user to perform the action.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is often challenging for a new user of a software application, such as QuickBooks Online, to know how to start using the software application, due to the many features and options provided by the software application. The disclosed invention recommends a first action for a new user of the software application, by matching pre-signup data of the new user to descriptions of actions performed by the software application. Examples of actions may include: organizing expenses, sending and tracking invoices, managing inventory, etc. The pre-signup data may include: 1) search terms entered by the user into a search engine; 2) descriptions of webpages of the software application visited by the user; and/or 3) descriptions of buttons of the software application clicked by the user. The pre-signup data may provide useful clues regarding the user's practical goal for using the software application.

The pre-signup data and the descriptions of actions may be converted to numerical vectors that represent the semantics of the pre-signup data and the descriptions of actions.

Topics may be extracted from the pre-signup data vector and the action description vectors. One or more actions are then recommended to the new user by matching the topics extracted from the pre-signup data vector to the topics extracted from the action description vectors. The recommended actions are actions which have a description corresponding to topics that best match the topics in the pre-signup data. For example, the recommended actions may be top-ranked actions according to scores based on the pre-signup data vector and the action description vectors. A workflow may then be presented to the user to perform the recommended action(s).

A practical first action for the new user to perform may be predicted and facilitated, using the pre-signup data of the new user. Thus, the onboarding experience of the new user may be a smooth, valuable, and productive experience, potentially resulting in accelerated onboarding, increased product engagement, and positive customer ratings.

Figure 1:
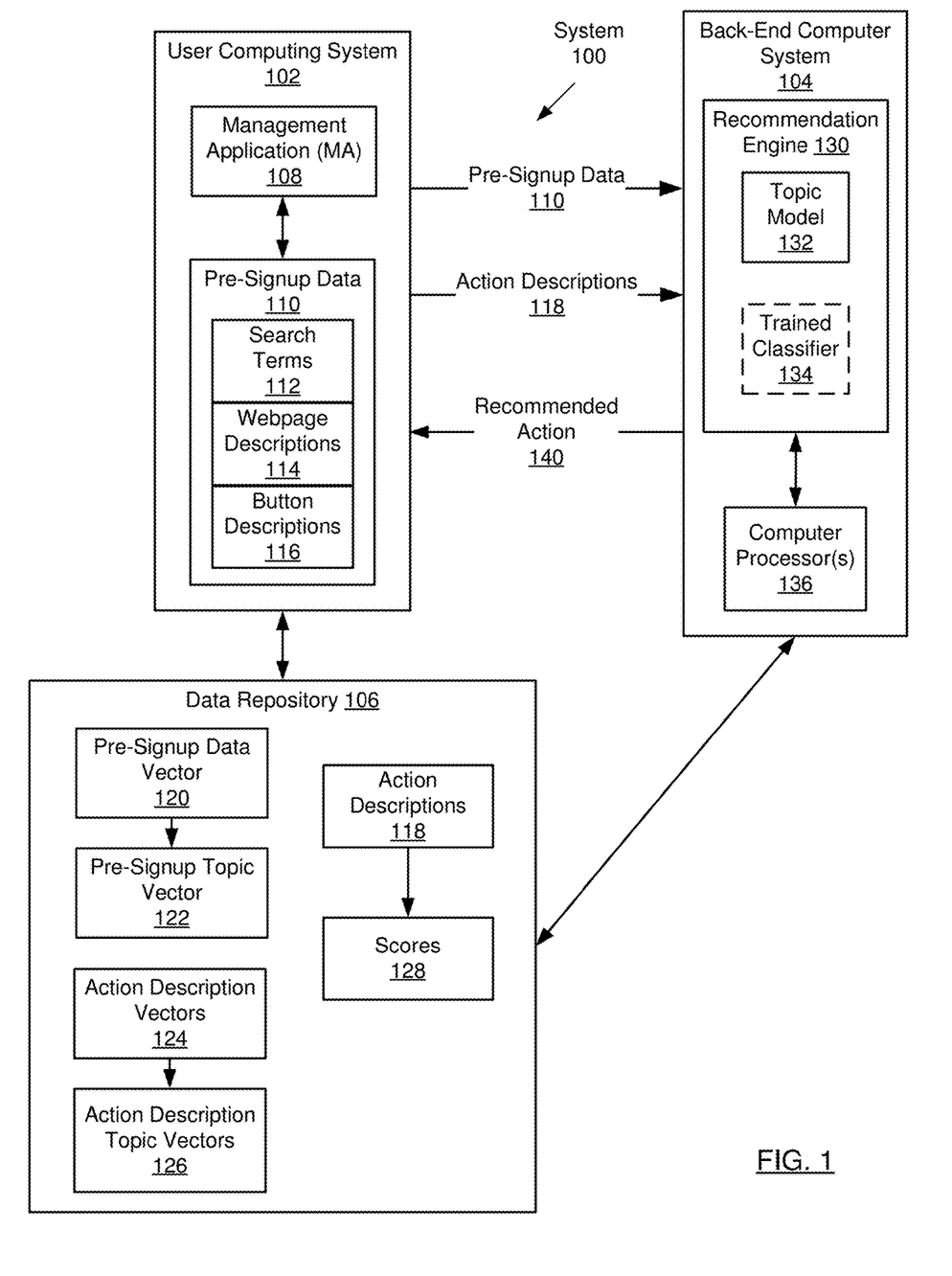
FIG. 1 and FIG. 2 show a system in accordance with one or more embodiments of the invention.

FIG. 1 shows a flow diagram of a system (100) in accordance with one or more embodiments. As shown in FIG. 1, the system (100) includes multiple components such as the user computing system (102), a back-end computer system (104), and a data repository (106). Each of these components is described below.

In one or more embodiments, the user computing system (102) provides, to a user, a variety of computing functionality. For example, the computing functionality may include word processing, multimedia processing, financial management, business management, social network connectivity, network management, and/or various other functions that a computing device performs for a user. The user may be a small business owner. Alternatively, the user may be a company employee that acts as a sender, a potential sender, or a requestor of services performed by a company (e.g., a client, a customer, etc.) of the user computing system. The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) may take the form of the computing system (500) shown in FIG. 5A connected to a network (520) as shown in FIG. 5B.

The user computing system (102) includes a management application (MA) (108) and pre-signup data (110) in accordance with one or more embodiments. The pre-signup data (110) may be stored in the data repository (106). The MA (108), in accordance with one or more embodiments, is a software application written in any programming language that includes executable instructions stored in some sort of memory. The instructions, when executed by one or more processors, enable a device to perform the functions described in accordance with one or more embodiments. In one or more embodiments, the MA (108) is capable of assisting a user with the user's finances or business needs. For example, the MA (108) may be any type of financially-based application such as a tax program, a personal budgeting program, a small business financial program, or any other type of program that assists with finances.

The MA (108) may include a user interface (UI) (not shown) for receiving input from a user and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device. For example, the UI may be an interface of a software application providing the functionality to the user (e.g., a local gaming application, a word processing application, a financial management application, network management application, business management application etc.). In such a scenario, the help menu, popup window, frame, or other portion of the UI may connect to the MA (108) and present output.

The MA (108) may include functionality to send pre-signup data (110) and/or action descriptions (118) to the recommendation engine (130). In one or more embodiments, the pre-signup data (110) includes data generated as a result of a user interacting with the user computing system (102) prior to the user creating an account with the MA (108). The pre-signup data (110) may represent a goal of a user to perform one or more specific actions using the MA (108). Examples of actions performed by the MA (108) may include organizing expenses, sending and tracking invoices, managing inventory, etc. The pre-signup data (110) may include search terms (112), webpage descriptions (114), and/or button descriptions (116). The search terms (112) are tokens used in search queries entered by the user into a search engine (e.g., Google, Bing, etc.). The tokens may be alphanumeric strings. For example, a token may include a single word, multiple words, a numerical expression, etc. The search engine may execute in a browser running on the user computing system (102).

The webpage descriptions (114) are tokens included in the content of one or more webpages of the MA (108) accessed by the user. For example, a webpage may be a single-action webpage that corresponds to a specific action performed by the MA (108). The button descriptions (116) are tokens included in the content corresponding to buttons and/or links of the MA (108). For example, a button may correspond to a specific product or service offered by the MA (108). The pre-signup data (110) may correspond to an identifier (e.g., a unique identifier) of the user. In one or more embodiments, each of the action descriptions (118) include tokens describing an action performed by the MA (108) for users.

Figure 2:
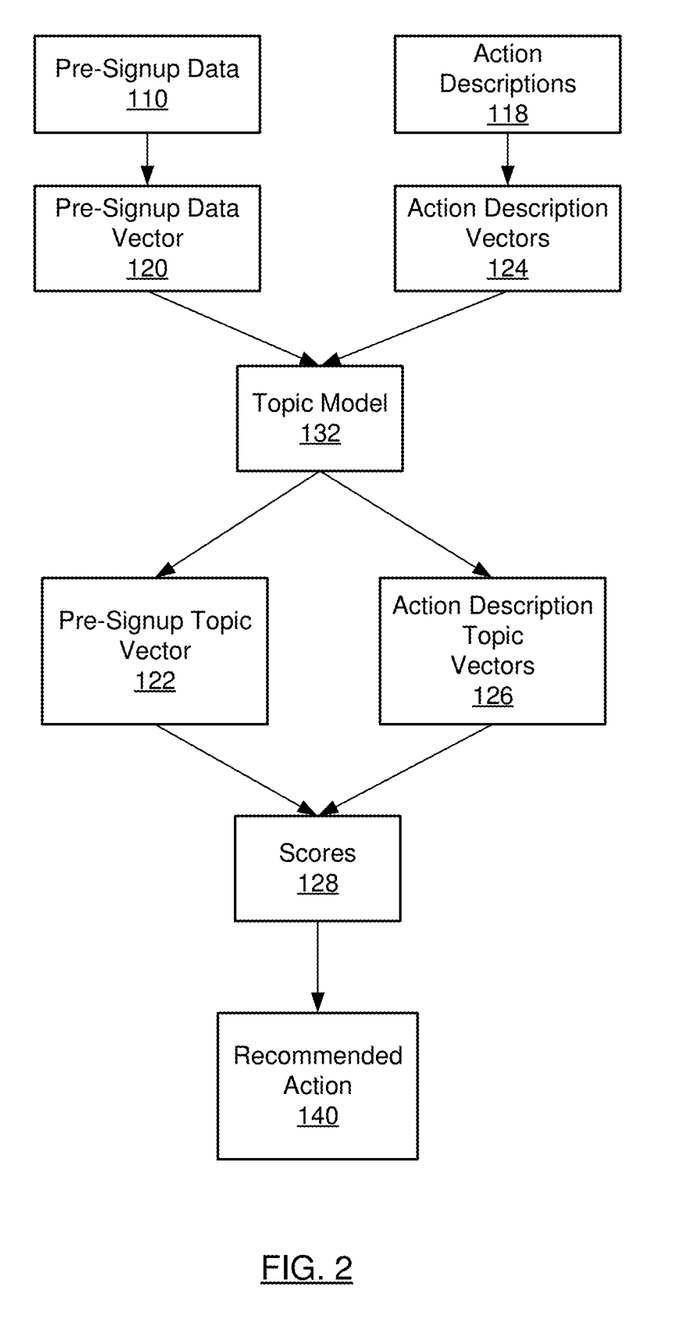

Turning to FIG. 2, the recommendation engine (130) includes functionality to generate a pre-signup data vector (120) from the pre-signup data (110). A pre-signup data vector (120) is an embedding (e.g., a semantic representation) of the tokens of the pre-signup data (110). The pre-signup data vector (120) may be a vector (e.g., a point) in a multi-dimensional semantic space. For example, the embedding may be a word2vec embedding. The embedding may be formed using various cluster analysis techniques (e.g., k-means clustering, centroid-based clustering, hierarchical clustering, distribution-based clustering, density-based clustering, etc.). In one or more embodiments, the value assigned to each dimension of the pre-signup data vector (120) may be based on the co-occurrence of a token of the pre-signup data (110) with other tokens in a set of training data. Alternatively, the value assigned to each dimension of the pre-signup data vector (120) may be a binary value. For example, the binary value may indicate the presence or absence of a specific token.

In one or more embodiments, the pre-signup data vector (120) is a combination (e.g., a concatenation) of vectors corresponding to search terms (112), webpage descriptions (114), and/or button descriptions (116). The recommendation engine (130) includes functionality to generate action description vectors (124) from the action descriptions (118).

The recommendation engine (130) includes functionality to generate a pre-signup topic vector (122) from the pre-signup data vector (120) using a topic model (132). That is, the recommendation engine (130) may apply the topic model (132) to identify one or more topics associated with the tokens of the pre-signup data (110). Examples of topics may include: expenses, invoices, taxes, payroll, mileage, etc. The pre-signup topic vector (122) may be a probability distribution of topics corresponding to the pre-signup data (110). The topic model (132) may be based on latent Dirichlet allocation (LDA) or a dynamic topic model (DTM). The topic model (132) may be trained using tokens of a training corpus. For example, the training corpus used to train the topic model (132) may be specific to terminology used in the MA (108).

Similarly, the recommendation engine (130) includes functionality to generate action description topic vectors (126) from the action description vectors (124) using the topic model (132). That is, the recommendation engine (130) may apply the topic model (132) to identify one or more topics associated with the tokens of each of the action descriptions (118). The action description topic vectors (126) may be probability distributions of topics corresponding to the action descriptions (118). In one or more embodiments, the topic model used to generate the action description topic vectors (126) from the action description vectors (124) is the same topic model used to generate the pre-signup topic vector (122) from the pre-signup data vector (120). Alternatively, different topic models may be used to generate the action description topic vectors (126) and the pre-signup topic vector (122). For example, the topic model used to generate the action description topic vectors (126) and the topic model used to generate the pre-signup topic vector (122) may be trained using different training corpora.

The recommendation engine (130) includes functionality to generate scores (128) for action descriptions (118) by combining the pre-signup topic vector (122) and the action description topic vectors (126). The scores (128) measure the similarity between the topics in the pre-signup data (110) and the topics in the action descriptions (118). For example, the recommendation engine (130) may generate the scores (128) by multiplying the pre-signup topic vector (122) and the action description topic vectors (126). Each of the scores (128) represents a prediction (e.g., a probability) that the action description corresponding to the respective action description topic vector represents the best match to the pre-signup data (110) of the user. The recommendation engine (130) includes functionality to send, to the MA (108), a recommended action (140) using the scores (128). The recommended action (140) may be an action of the MA (108) that corresponds to one of the action descriptions (118). For example, the recommended action (140) may be the action of the MA (108) whose action description topic vector corresponds to the highest score when multiplied with the pre-signup topic vector (122).

Returning to FIG. 1, in one or more embodiments, the recommendation engine (130) optionally includes functionality to calculate a confidence level for the recommended action (140). The confidence level may initially be based on the score (e.g., a cosine similarity) between the action description topic vector corresponding to the recommended action (140) and the pre-signup topic vector (122). A threshold may be applied to filter out low confidence predictions. A/B testing may be used to optimize the confidence level calculation based on the likelihood that the user will perform the recommended action (140) using the MA (108). A trained classifier (134) may be trained using a training set of recommended actions for users each labeled with an outcome. For example, the outcome may indicate whether the user completed the recommended action. Continuing this example, if the recommended action was "send invoice", then the outcome may indicate whether the user sent an invoice to a customer using the MA (108). Alternatively, the outcome may indicate whether the user attempted the recommended action. For example, the outcome may indicate whether the user attempted to send an invoice using the MA (108). In this manner, feedback from actual user actions may be used to train the classifier. Alternatively or additionally, feedback based on A/B tests may be used to train the classifier.

The trained classifier (134) may be implemented as various types of deep learning classifiers such as a neural network classifier (e.g., based on convolutional neural networks (CNNs)), random forest classifier, stochastic gradient descent (SGD) classifier, lasso classifier, gradient boosting classifier such as XGBoost, bagging classifier, adaptive boosting (AdaBoost) classifier, ridge classifier, elastic net classifier, or Nu Support Vector Regression (NuSVR) classifier. Deep learning, also known as deep structured learning or hierarchical learning, is part of a broader family of machine learning methods based on learning data representations, as opposed to task-specific algorithms.

The data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site. The data repository (106) may be accessed online via a cloud service (e.g., Amazon Web Services, Egnyte, Azure, etc.). In one or more embodiments, the data repository (106) includes functionality to store the pre-signup data (110), the action descriptions (118), the pre-signup data vector (120), the pre-signup topic vector (122), the action description vectors (124), the action description topic vectors (126), and/or the scores (128).

The back-end computer system (104) is communicatively connected to the user computing system (102) such as through one or more networks. The back-end computer system (104) includes the recommendation engine (130) and computer processor(s) (136).

In one or more embodiments, the computer processor(s) (136) takes the form of the computer processor(s) (502) described with respect to FIG. 5A and the accompanying description below.

While FIG. 1 and FIG. 2 show a configuration of components, other configurations may be used without departing from the scope of the invention. For example, various components may be combined to create a single component. As another example, the functionality performed by a single component may be performed by two or more components. Continuing this example, the MA (108) of the user computing system (102)) and/or the recommendation engine (130) of the back-end computer system (104) may include the functionality of the data repository (106). In addition, FIG. 2 shows a specific, non-limiting flow using components included in FIG. 1.

Figure 3A:
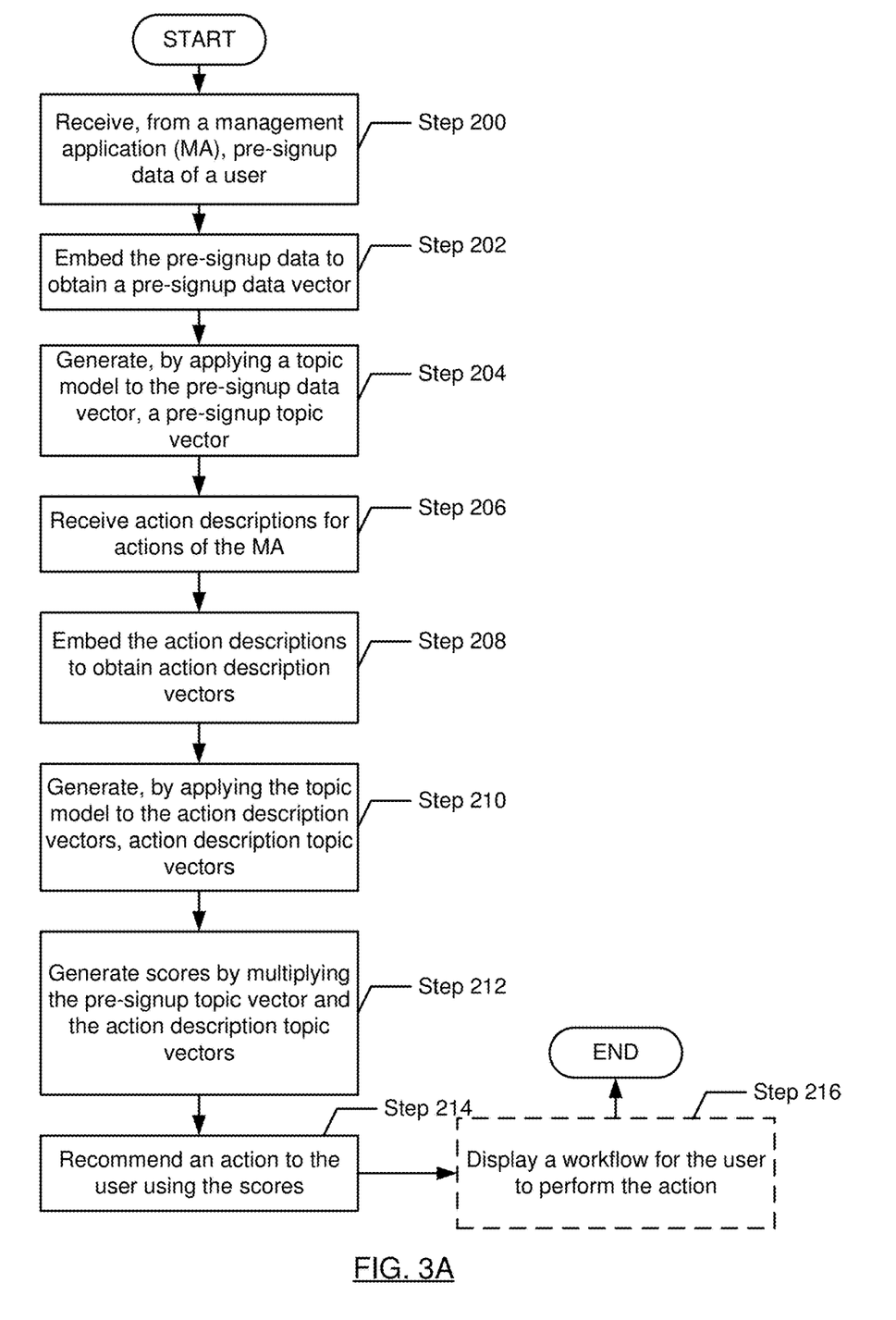
FIG. 3A and FIG. 3B show flowcharts in accordance with one or more embodiments of the invention.

FIG. 3A shows a flowchart in accordance with one or more embodiments of the invention. The flowchart depicts a process for recommending an action. One or more of the steps in FIG. 3A may be performed by the components (e.g., the recommendation engine (130) of the back-end computer system (104) and the management application (MA) (108) of the user computing system (102)), discussed above in reference to FIG. 1. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 200, pre-signup data of a user is received from a management application (MA). In one or more embodiments, the recommendation engine receives the pre-signup data from the management application. The management application may receive the pre-signup data via a graphical user interface (GUI).

In one or more embodiments, additional data about the user (e.g., demographic data) may be used as features in the recommendation engine when direct search terms are not available. The recommendation engine may obtain additional data about the user (e.g., from a third party data source). For example, the user may work at a small business, and the additional data may include demographic data such as the size, industry code, annual revenue, etc. of the small business.

In Step 202, the pre-signup data is embedded to obtain a pre-signup data vector. In one or more embodiments, the recommendation engine embeds the search terms, the webpage descriptions, and/or the button descriptions in separate vectors, and then combines (e.g., concatenates) the separate vectors into the pre-signup data vector for the user.

Prior to embedding, the recommendation engine may preprocess the pre-signup data by converting the pre-signup data to one or more tokens. For example, the preprocessing may include extracting alphanumeric keywords from the pre-signup data and/or removing stopwords from the pre-signup data.

Alternatively, in one or more embodiments, the recommendation engine applies the term frequency-inverse document frequency (TFIDF) approach to score the tokens of the pre-signup data according to the relative importance of each token in a collection of training data. After the TFIDF calculations, the recommendation engine may encode the pre-signup data as a vector of TFIDF scores, where each position in the vector corresponds to a token.

In Step 204, a pre-signup topic vector is generated by applying a topic model to the pre-signup data vector. The recommendation engine applies the topic model to identify one or more topics associated with the tokens of the pre-signup data of the user. The pre-signup topic vector is a probability distribution of topics corresponding to the pre-signup data of the user.

In Step 206, action descriptions for actions of the MA are received. The recommendation engine may receive the action descriptions from the MA. Alternatively, the recommendation engine may obtain the action descriptions from a repository. In one or more embodiments, an action description of an action may be derived using one or more search terms of the pre-signup data of one or more new users who performed (e.g., completed) the action upon creating an account with the MA.

In Step 208, the action descriptions are embedded to obtain action description vectors (see description of Step 202 above).

In Step 210, action description topic vectors are generated by applying the topic model to the action description vectors (see description of Step 204 above). The recommendation engine applies the topic model to identify one or more topics associated with the tokens of each of the action descriptions. The action description vectors are probability distributions of topics corresponding to the action descriptions.

In Step 212, scores are generated by multiplying the pre-signup topic vector and the action description topic vectors. Each score may indicate the probability that the action description corresponding to the respective action description topic vector represents the best match to the pre-signup data of the user. In one or more embodiments, the score is based on the cosine similarity of the pre-signup topic vector and the respective action description topic vector. The recommendation engine may generate, using the scores, a ranked list of actions for the user to perform via the MA.

In Step 214, an action is recommended to the user using the scores. In one or more embodiments, the recommendation engine recommends the action corresponding to the highest score. For example, the action corresponding to the highest score may correspond to the action description topic vector with the highest cosine similarity relative to the pre-signup topic vector. Alternatively, the recommendation engine may send, to the user, the ranked list of actions and corresponding scores. For example, the recommendation engine may send, to the user, the actions corresponding to the top 2 or 3 highest scores.

In one or more embodiments, the recommendation engine calculates (e.g., predicts) a confidence level for the recommended action using a trained classifier. The confidence level may indicate the likelihood that the user will perform the recommended action. The recommendation engine may recommend the action to the user when the confidence level for the recommended action exceeds a threshold confidence level. If there are no actions whose corresponding confidence level exceeds the threshold confidence level, the recommendation engine may recommend a default action. For example, the default action may be based on one or more of the following: actions corresponding to the most popular features of the MA, actions corresponding to the easiest to use MA features, etc.

In Step 216, a workflow for the user to perform the action is displayed. The workflow may include a sequence of one or more steps. For example, a step may be clicking on a button or a link in a graphical user interface (GUI) of the MA. Alternatively, a step may be entering data into the GUI of the MA. For example, a step may be entering an account identifier of an account of the user at a financial institution. Continuing this example, the account may include sales transactions of the user that have not yet been invoiced, or may include expense transactions of the user that have not yet been tracked.

The workflow may be displayed via an element within the GUI. The element (e.g., a widget) may be generated by a computer processor and rendered within the GUI.

In one or more embodiments, the recommendation engine may receive, in response to displaying the workflow, a notification that the user completed the recommended action. In response to receiving the notification, the recommendation engine may update the classifier by adding a new record to the training data, where the record indicates, as an outcome, the completion of the recommended action by the user. Alternatively, the recommendation engine may receive, in response to displaying the workflow, a notification that the user has not completed the recommended action within a predetermined time interval.

Figure 3B:
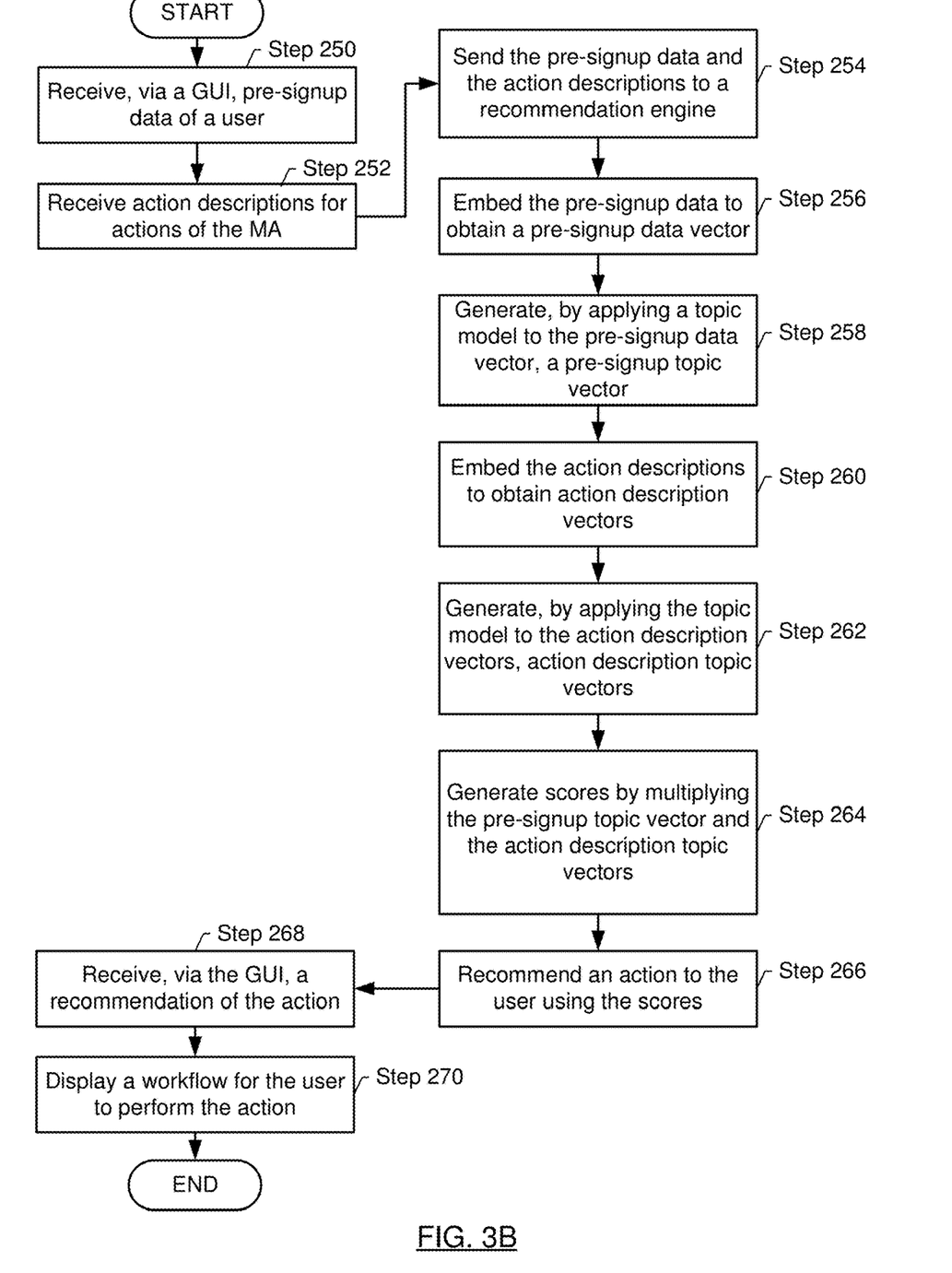

FIG. 3B shows a flowchart in accordance with one or more embodiments of the invention. The flowchart depicts a process for recommending an action. One or more of the steps in FIG. 3B may be performed by the components (e.g., the recommendation engine (130) of the back-end computer system (104) and the management application (MA) (108) of the user computing system (102)), discussed above in reference to FIG. 1. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 250, pre-signup data of a user is received via a graphical user interface (GUI) (see description of Step 200 above).

In Step 252, action descriptions for actions of the management application (MA) are received (see description of Step 206 above).

In Step 254, the pre-signup data and the action descriptions are sent to a recommendation engine. The pre-signup data and the action descriptions may be sent to the recommendation engine by the management application over a network.

In Step 256, the pre-signup data is embedded to obtain a pre-signup data vector (see description of Step 202 above).

In Step 258, a pre-signup topic vector is generated by applying a topic model to the pre-signup data vector (see description of Step 204 above).

In Step 260, the action descriptions are embedded to obtain action description vectors (see description of Step 202 above).

In Step 262, action description topic vectors are generated by applying the topic model to the action description vectors (see description of Step 204 above).

In Step 264, scores are generated by multiplying the pre-signup topic vector and the action description topic vectors (see description of Step 212 above).

In Step 266, an action is recommended to the user using the scores (see description of Step 214 above).

In Step 268, the recommendation of the action is received by the GUI. In one or more embodiments, the recommendation is sent, over the network, by the recommendation engine to the management application.

In Step 270, a workflow for the user to perform the action is displayed (see description of Step 216 above).

Figure 4A:
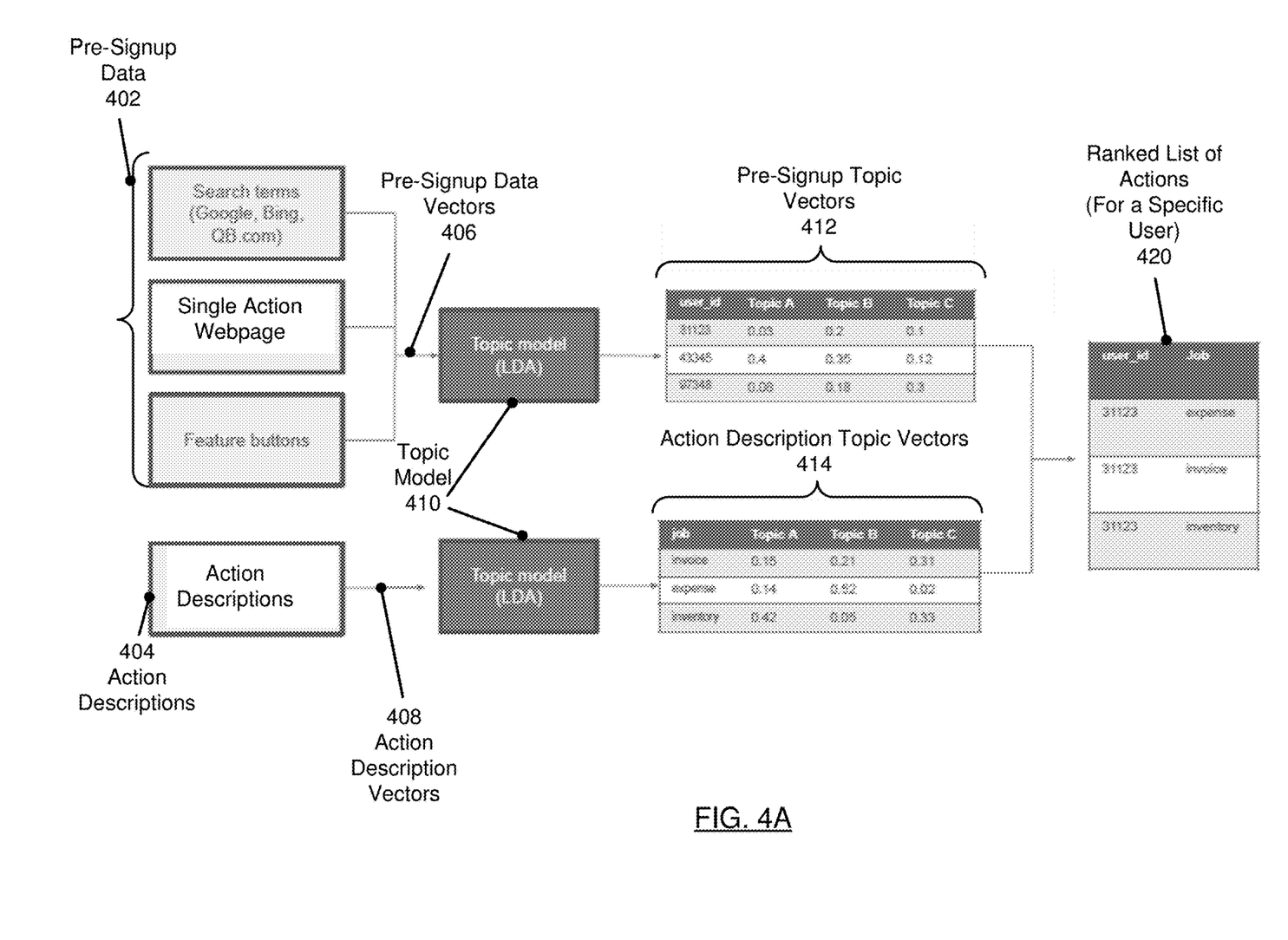
FIG. 4A, FIG. 4B, FIG. 4C, and FIG. 4D show examples in accordance with one or more embodiments of the invention.
Figure 4B:
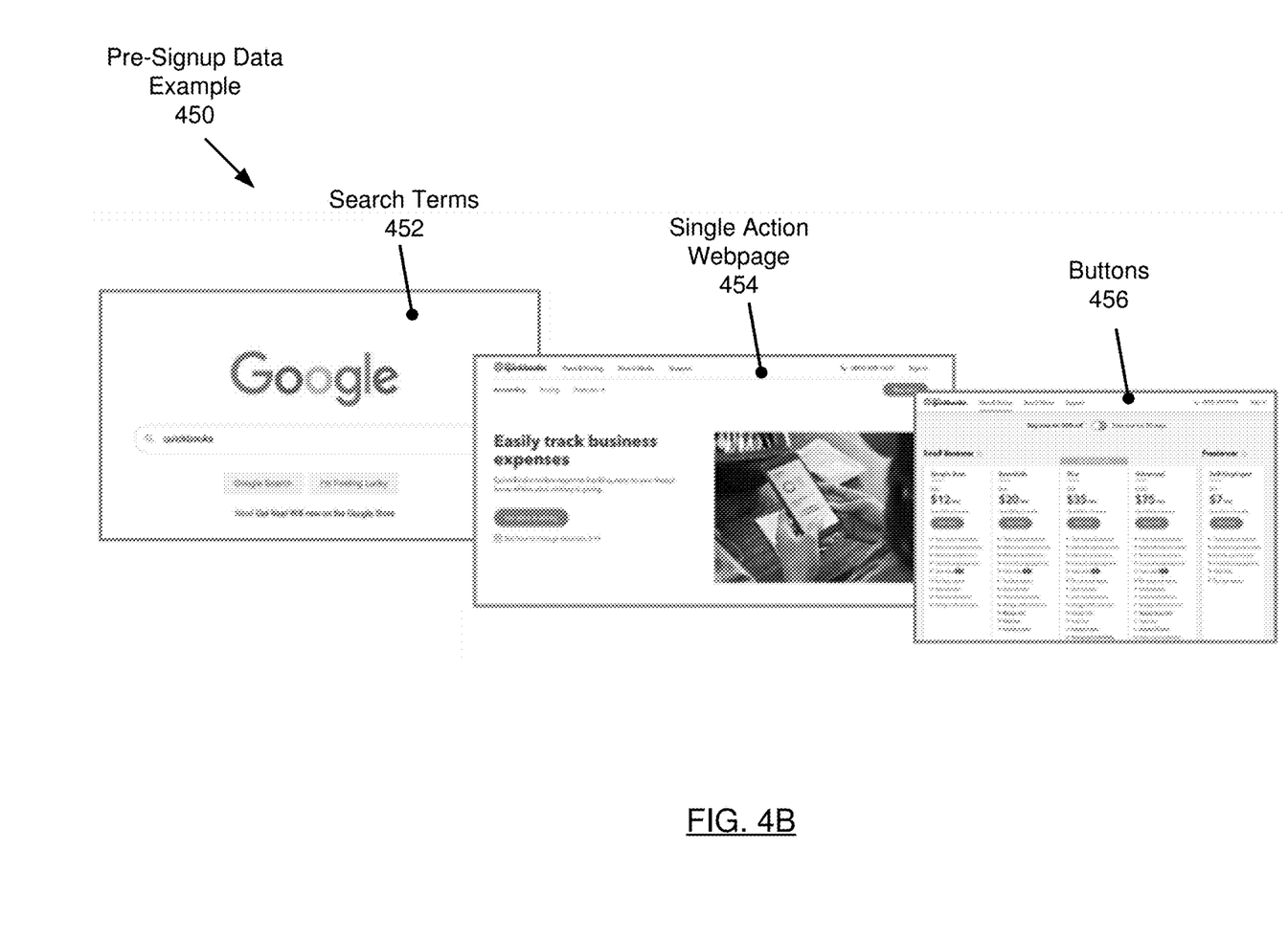

The following example is for explanatory purposes only and not intended to limit the scope of the invention. FIG. 4A, FIG. 4B, FIG. 4C, and FIG. 4D show an implementation example in accordance with one or more embodiments of the invention. FIG. 4A shows pre-signup data (402) ((110) in FIG. 1 and FIG. 2) of new users of a management application (MA), QuickBooks. FIG. 4B shows a pre-signup data example (450) based on search terms (452), a single action webpage (454), and buttons (456). The search terms (452) were entered into the Google search engine by a user prior to creating an account with a management application (MA), QuickBooks. The single action webpage (454) is a QuickBooks webpage that focuses on a specific action performed by QuickBooks, in this case, tracking expenses. The single action webpage (454) was browsed by the user prior to creating the QuickBooks account. The buttons (456) are buttons of the QuickBooks application that were clicked by the user prior to creating the QuickBooks account. Each of the buttons corresponds to one or more actions performed by QuickBooks.

FIG. 4A also shows action descriptions (404) ((118) in FIG. 1 and FIG. 2) describing various actions performed by QuickBooks for users. The recommendation engine embeds the pre-signup data (402) into pre-signup data vectors (406) ((120) in FIG. 1 and FIG. 2). Each of the pre-signup data vectors (406) corresponds to the pre-signup data (402) of a specific user. The recommendation engine also embeds the action descriptions (404) into action description vectors (408) ((124) in FIG. 1 and FIG. 2).

Next, the recommendation engine generates, using a topic model (410) ((132) in FIG. 1 and FIG. 2), pre-signup topic vectors (412) ((122) in FIG. 1 and FIG. 2) from the pre-signup data vectors (406). The pre-signup topic vectors (412) represent probability distributions of topics implied in the pre-signup data vectors (406). Similarly, the recommendation engine generates, using the topic model (410), action description topic vectors (414) ((126) in FIG. 1 and FIG. 2) from the action description vectors (408). In other words, the pre-signup topic vectors (412) represent the goals of users, expressed a probability distributions of topics, and the action description topic vectors (414) represent the potential actions that users may perform using QuickBooks, also expressed as a probability distributions of topics.

Figure 4C:
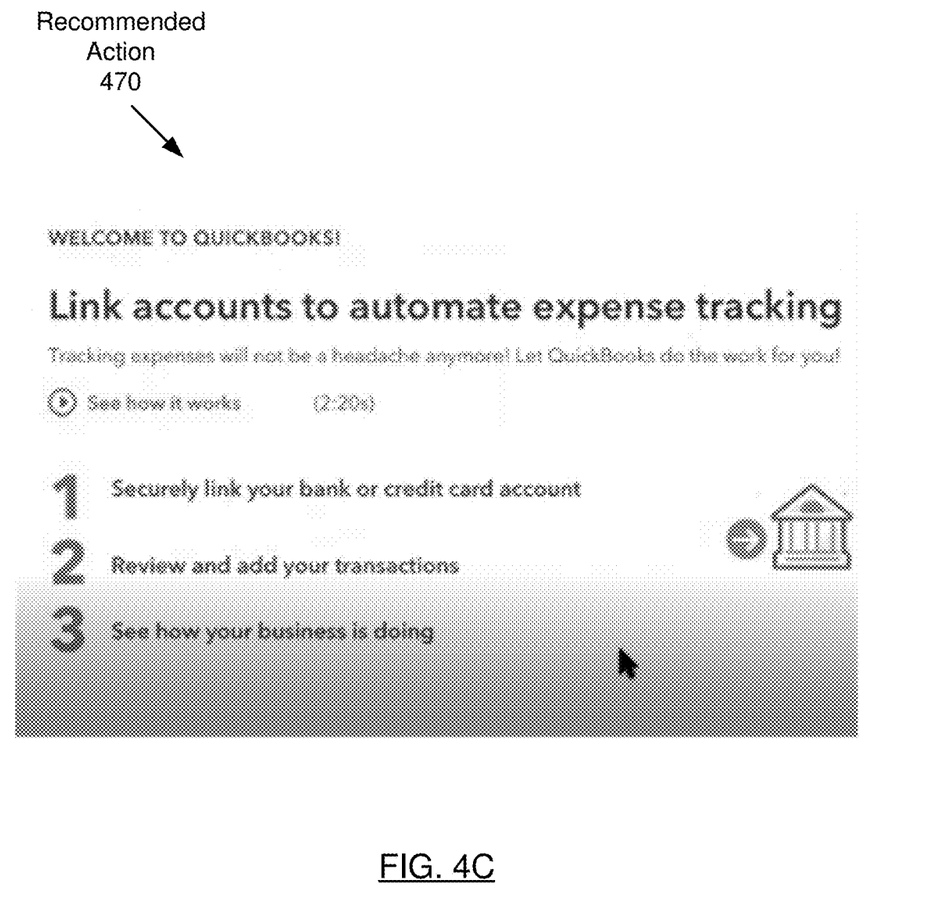

The recommendation engine next finds the best matching action description topic vector (414) for the pre-signup topic vector (412) of each user. The recommendation engine generates scores for each user by multiplying the pre-signup topic vector (412) for the user and the action description topic vectors (414), resulting in a ranked list of actions. The scores are a measure of the similarity, and thus the strength of a match between the topics in the pre-signup data (402) and the topics in the action descriptions (404). FIG. 4A shows a ranked list of actions (420) for a specific user. The tracking expenses action corresponds to the action description topic vector (414) with the highest score (e.g., the highest cosine similarity) relative to the pre-signup topic vector (412) for the user. Thus, the recommendation engine selects the tracking expenses action as the recommended action (470) ((140) in FIG. 1 and FIG. 2) as shown in FIG. 4C.

Figure 4D:
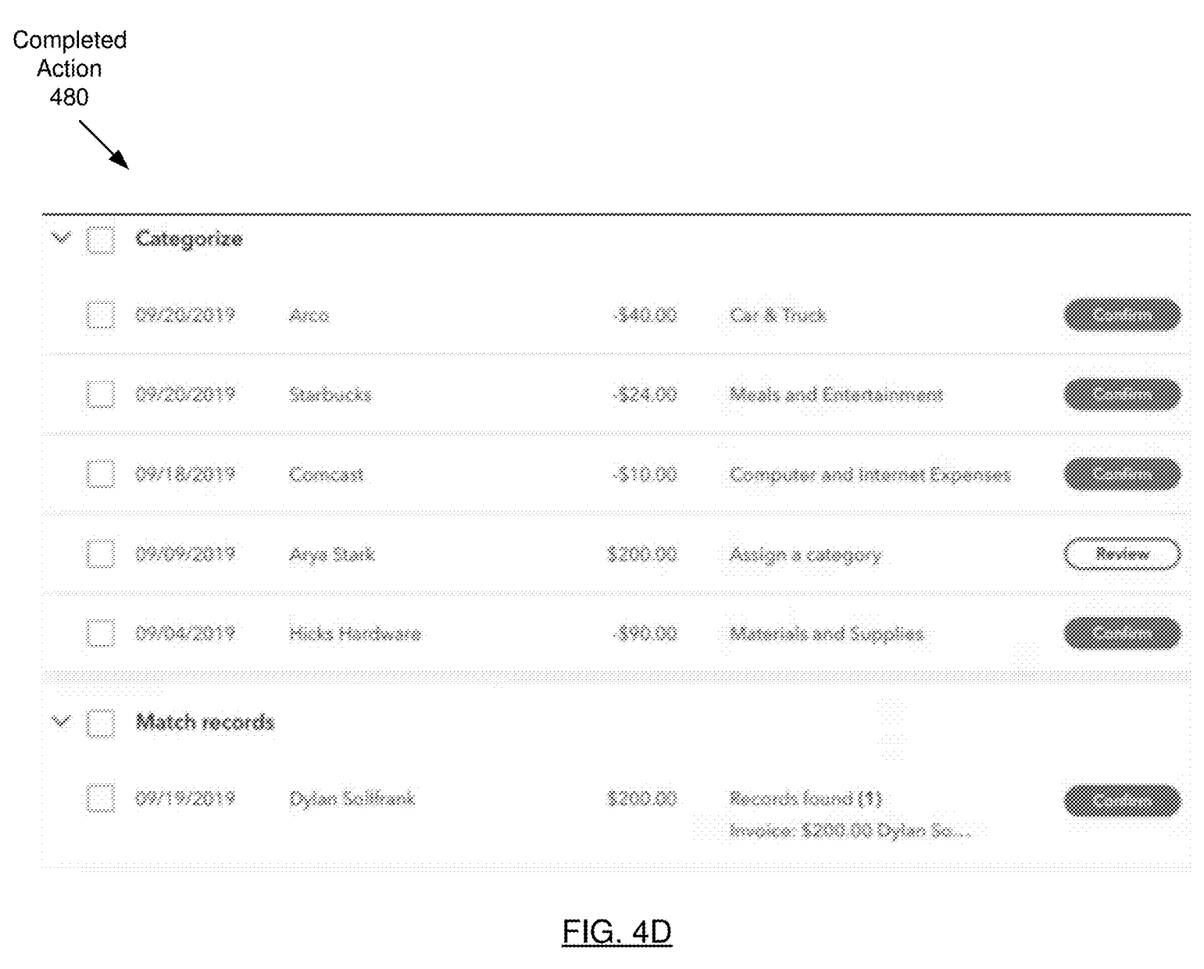

The recommendation engine recommends a workflow for the user to perform the tracking expenses action. The workflow includes various steps, such as adding an account at a financial institution (e.g., a credit card company or bank), entering login credentials for the account, connecting to the account at the financial institution, importing transactions from the account, categorizing the transactions, and reviewing the transactions. FIG. 4D shows that transactions of the user have been imported and categorized, and thus the action has been completed (480) by the user.

The recommendation engine has successfully predicted and facilitated, using the pre-signup data (402) of the user, a practical recommended action (470) in QuickBooks for the user to perform after creating a QuickBooks account. Thus, the onboarding experience of the new user has been a smooth, simple, practical, and productive experience.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
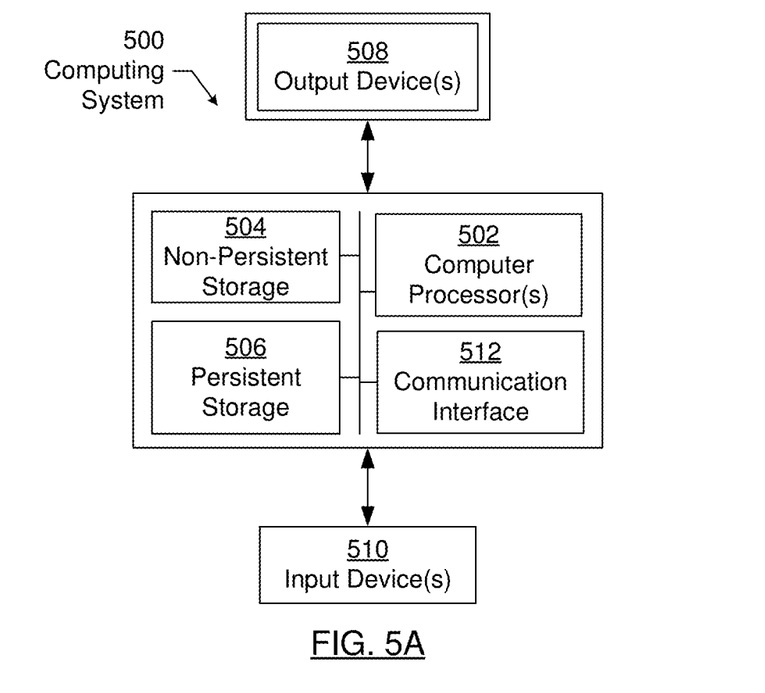
FIG. 5A and FIG. 5B show computing systems in accordance with one or more embodiments of the invention.
Figure 5B:
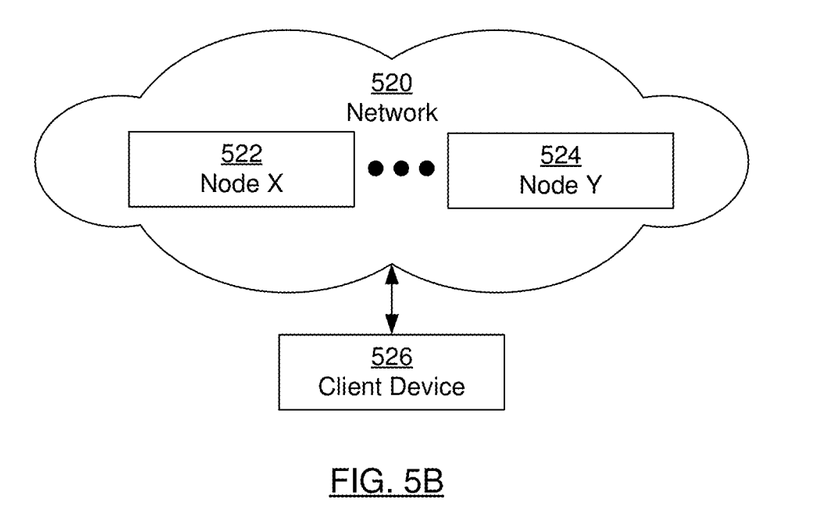

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, from a software application, pre-signup data of a user;
embedding the pre-signup data to obtain a pre-signup data vector;
generating, by applying a topic model to the pre-signup data vector, a pre-signup topic vector;
receiving a plurality of action descriptions of a plurality of actions of the software application;
embedding the plurality of action descriptions to obtain a plurality of action description vectors;
generating, by applying the topic model to the plurality of action description vectors, a plurality of action description topic vectors;
generating a plurality of scores by multiplying the pre-signup topic vector and the plurality of action description topic vectors; and
recommending, to the user and using the plurality of scores, an action of the plurality of actions.

2. The method of claim 1, further comprising:
displaying, in an element within a graphical user interface (GUI) of the software application generated by a computer processor, a workflow for the user to perform the action.

3. The method of claim 1, further comprising:
training a classifier using a plurality of actions recommended to a plurality of users,
wherein the plurality of actions recommended to the plurality of users are labeled with a plurality of outcomes, and
wherein each of the plurality of outcomes indicates whether the respective user performed the respective recommended action.

4. The method of claim 3, further comprising:
determining, using the trained classifier, a confidence level for the action, wherein the action is recommended when the confidence level exceeds a threshold confidence level.

5. The method of claim 4, further comprising:
displaying, in an element within a graphical user interface (GUI) of the software application generated by a computer processor, a workflow for the user to perform the action;
receiving, in response to displaying the workflow, a notification that the user completed the action; and
updating, using the notification, the trained classifier.

6. The method of claim 1,
wherein the pre-signup data comprises search terms entered in a search engine, a description of a webpage of the software application visited by the user, and a description of a button of the software application clicked by the user, and
wherein embedding the pre-signup data comprises:
embedding the search terms to obtain a first vector,
embedding the description of the webpage to obtain a second vector,
embedding the description of the button to obtain a third vector, and
concatenating the first vector, the second vector, and the third vector.

7. The method of claim 1, wherein the plurality of scores are based on a cosine similarity between the pre-signup topic vector and the plurality of action description topic vectors.

8. A system, comprising:
a computer processor;
a repository configured to store pre-signup data of a user, a plurality of action descriptions of a plurality of actions of a software application, a pre-signup data vector, a pre-signup topic vector, a plurality of action description vectors, a plurality of action description topic vectors, and a plurality of scores; and
a recommendation engine, executing on the computer processor and configured to:
receive, from the software application, the pre-signup data,
embed the pre-signup data to obtain the pre-signup data vector,
generate, by applying a topic model to the pre-signup data vector, the pre-signup topic vector,
receive the plurality of action descriptions,
embed the plurality of action descriptions to obtain the plurality of action description vectors,
generate, by applying the topic model to the plurality of action description vectors, the plurality of action description topic vectors,
generate the plurality of scores by multiplying the pre-signup topic vector and the plurality of action description topic vectors, and
recommend to the user and using the plurality of scores, an action of the plurality of actions.

9. The system of claim 8, further comprising a graphical user interface (GUI) configured to:
display, in an element within the GUI generated by the computer processor, a workflow for the user to perform the action.

10. The system of claim 8, wherein the recommendation engine is further configured to:
train a classifier using a plurality of actions recommended to a plurality of users,
wherein the plurality of actions recommended to the plurality of users are labeled with a plurality of outcomes, and
wherein each of the plurality of outcomes indicates whether the respective user performed the respective recommended action.

11. The system of claim 10, wherein the recommendation engine is further configured to:
determine, using the trained classifier, a confidence level for the action, wherein the action is recommended when the confidence level exceeds a threshold confidence level.

12. The system of claim 11, wherein the GUI is further configured to:
display, in an element within the GUI generated by the computer processor, a workflow for the user to perform the action,
receive, in response to displaying the workflow, a notification that the user completed the action, and
update, using the notification, the trained classifier.

13. The system of claim 8,
wherein the pre-signup data comprises search terms entered in a search engine, a description of a webpage of the software application visited by the user, and a description of a button of the software application clicked by the user, and
wherein the recommendation engine is further configured to embed the pre-signup data by:
embedding the search terms to obtain a first vector;
embedding the description of the webpage to obtain a second vector;
embedding the description of the button to obtain a third vector; and
concatenating the first vector, the second vector, and the third vector.

14. The system of claim 8, wherein the plurality of scores are based on a cosine similarity between the pre-signup topic vector and the plurality of action description topic vectors.

15. A method comprising:
receiving, via a graphical user interface (GUI), pre-signup data of a user;
receiving a plurality of action descriptions of a plurality of actions of a software application;
sending the pre-signup data and the plurality of action descriptions to a recommendation engine, wherein the recommendation engine:
embeds the pre-signup data to obtain a pre-signup data vector,
generates, by applying a topic model to the pre-signup data vector, a pre-signup topic vector,
embeds the plurality of action descriptions to obtain a plurality of action description vectors,
generates, by applying the topic model to the plurality of action description vectors, a plurality of action description topic vectors,
generates a plurality of scores by multiplying the pre-signup topic vector and the plurality of action description topic vectors, and
recommends, to the user and using the plurality of scores, an action of the plurality of actions,
receiving, via the GUI, a recommendation of the action, and
displaying, in an element within the GUI generated by a computer processor, a workflow for the user to perform the action.

16. The method of claim 15, further comprising:
training a classifier using a plurality of actions recommended to a plurality of users,
wherein the plurality of actions recommended to the plurality of users are labeled with a plurality of outcomes, and
wherein each of the plurality of outcomes indicates whether the respective user performed the respective recommended action.

17. The method of claim 16, further comprising:
determining, using the trained classifier, a confidence level for the action, wherein the action is recommended when the confidence level exceeds a threshold confidence level.

18. The method of claim 17, further comprising:
displaying, in an element within a graphical user interface (GUI) of the software application generated by a computer processor, a workflow for the user to perform the action.

19. The method of claim 18, further comprising:
receiving, in response to displaying the workflow, a notification that the user completed the action; and
updating, using the notification, the trained classifier.

20. The method of claim 15,
wherein the pre-signup data comprises search terms entered in a search engine, a description of a webpage of the software application visited by the user, and a description of a button of the software application clicked by the user, and
wherein embedding the pre-signup data comprises:
embedding the search terms to obtain a first vector,
embedding the description of the webpage to obtain a second vector,
embedding the description of the button to obtain a third vector, and
concatenating the first vector, the second vector, and the third vector.

\* \* \* \* \*